United States Patent
Burd et al.

(10) Patent No.: US 10,930,315 B2
(45) Date of Patent: *Feb. 23, 2021

(54) ERROR CORRECTION FOR STORAGE DEVICES

(71) Applicant: Marvell Asia Pte, Ltd., Singapore (SG)

(72) Inventors: Gregory Burd, San Jose, CA (US); Nedeljko Varnica, Sunnyvale, CA (US); Heng Tang, Sunnyvale, CA (US)

(73) Assignee: Marvell Asia Pte., Ltd., Singapore (SG)

( * ) Notice: Subject to any disclaimer, the term of this patent is extended or adjusted under 35 U.S.C. 154(b) by 107 days.

This patent is subject to a terminal disclaimer.

(21) Appl. No.: 16/253,027

(22) Filed: Jan. 21, 2019

(65) Prior Publication Data
US 2019/0172491 A1    Jun. 6, 2019

Related U.S. Application Data

(63) Continuation of application No. 15/921,610, filed on Mar. 14, 2018, now Pat. No. 10,186,296, which is a continuation of application No. 14/947,833, filed on Nov. 20, 2015, now Pat. No. 9,922,678, which is a continuation of application No. 14/642,526, filed on Mar. 9, 2015, now Pat. No. 9,201,731, which is a continuation of application No. 14/466,881, filed on
(Continued)

(51) Int. Cl.
*G11B 20/18* (2006.01)
*G06F 11/10* (2006.01)
*G11B 20/12* (2006.01)
*G06F 11/08* (2006.01)

(52) U.S. Cl.
CPC .......... *G11B 20/1833* (2013.01); *G06F 11/08* (2013.01); *G06F 11/1076* (2013.01); *G11B 20/1217* (2013.01); *G11B 2020/1222* (2013.01); *G11B 2020/1238* (2013.01)

(58) Field of Classification Search
None
See application file for complete search history.

(56) References Cited

U.S. PATENT DOCUMENTS 5,737,344 A * 4/1998 Belser ................ G11B 20/1833
714/6.24
5,737,742 A    4/1998 Achiwa et al.
(Continued)

OTHER PUBLICATIONS

U.S. Appl. No. 15/921,610, filed Mar. 14, 2018.
(Continued)

*Primary Examiner* — April Y Blair
*Assistant Examiner* — Matthew W Wahlin

(57) ABSTRACT

A method for performing error recovery for data stored on a track of a storage device, in which the method includes: receiving a request to read the data from the storage device, identifying a plurality of sectors of the track to be read in response to the request, reading the data from the plurality of sectors of the track and parity data, based on the data read from the plurality of sectors, determining whether any of the plurality of sectors corresponds to a failed sector, and recovering a portion of the data from the failed sector using the parity data and portions of the data stored in remaining ones of the plurality of sectors.

13 Claims, 7 Drawing Sheets

Related U.S. Application Data

Aug. 22, 2014, now Pat. No. 8,988,800, and a continuation-in-part of application No. 14/260,237, filed on Apr. 23, 2014, now Pat. No. 8,977,813, which is a continuation of application No. 13/844,302, filed on Mar. 15, 2013, now Pat. No. 8,725,944, which is a continuation of application No. 12/881,881, filed on Sep. 14, 2010, now Pat. No. 8,402,217.

(60) Provisional application No. 61/876,360, filed on Sep. 11, 2013, provisional application No. 61/254,577, filed on Oct. 23, 2009, provisional application No. 61/242,662, filed on Sep. 15, 2009.

(56) References Cited

U.S. PATENT DOCUMENTS

| | | | |
|---|---|---|---|
| 6,185,063 B1 | 2/2001 | Cameron | |
| 6,618,299 B2 | 9/2003 | Sohn et al. | |
| 6,967,810 B2 | 11/2005 | Kasiraj et al. | |
| 7,664,903 B2 | 2/2010 | Belonoznik et al. | |
| 7,702,880 B2 | 4/2010 | Chang et al. | |
| 7,975,090 B2 | 7/2011 | Auernhammer | |
| 8,041,884 B2 | 10/2011 | Chang | |
| 8,078,794 B2 | 12/2011 | Lee et al. | |
| 8,185,713 B2 | 5/2012 | Shin et al. | |
| 8,300,339 B1 | 10/2012 | Nangare et al. | |
| 8,392,687 B2 | 3/2013 | Asnaashari et al. | |
| 8,402,217 B2 | 3/2013 | Burd | |
| 8,447,915 B2 | 5/2013 | Araki et al. | |
| 8,484,414 B2 | 7/2013 | Sugimoto et al. | |
| 8,599,508 B1 | 12/2013 | Burd | |
| 8,625,215 B1 | 1/2014 | Burd et al. | |
| 8,638,513 B1 | 1/2014 | Burd | |
| 8,671,326 B1 | 3/2014 | Tang et al. | |
| 8,699,159 B1 | 4/2014 | Malina | |
| 8,699,162 B1 | 4/2014 | Grobis et al. | |
| 8,725,944 B2 | 5/2014 | Burd | |
| 8,749,905 B1 | 6/2014 | Malina | |
| 8,751,860 B2 | 6/2014 | Feeley et al. | |
| 8,806,300 B2 | 8/2014 | Kitahara et al. | |
| 8,977,813 B2 | 3/2015 | Burd | |
| 8,988,800 B1 | 3/2015 | Varnica et al. | |
| 8,998,800 B2 * | 4/2015 | Masaki ................ | A61B 1/0052 600/139 |
| 9,201,731 B2 | 12/2015 | Burd et al. | |
| 9,922,678 B2 | 3/2018 | Burd et al. | |
| 10,186,296 B2 | 1/2019 | Burd et al. | |
| 2008/0104307 A1* | 5/2008 | Van Rooyen ......... | G06F 3/0659 711/103 |
| 2009/0228762 A1 | 9/2009 | Kurashige | |
| 2010/0185802 A1 | 7/2010 | Asnaashari et al. | |
| 2010/0211737 A1 | 8/2010 | Flynn et al. | |
| 2010/0217919 A1 | 8/2010 | Sukegawa et al. | |
| 2010/0313065 A1 | 12/2010 | Feeley et al. | |
| 2011/0010489 A1 | 1/2011 | Yeh | |
| 2011/0191521 A1 | 8/2011 | Araki et al. | |
| 2012/0060073 A1 | 3/2012 | Itakura et al. | |
| 2012/0278679 A1* | 11/2012 | Rub ................. | H03M 13/3746 714/755 |
| 2013/0061111 A1* | 3/2013 | Sarcone ................. | G06F 11/10 714/758 |
| 2014/0055881 A1 | 2/2014 | Zaharris | |
| 2014/0237287 A1 | 8/2014 | Burd | |
| 2014/0281183 A1 | 9/2014 | Edgar et al. | |
| 2014/0281185 A1 | 9/2014 | Edgar et al. | |
| 2015/0081925 A1 | 3/2015 | Mapp et al. | |

OTHER PUBLICATIONS

U.S. Appl. No. 14/947,833, filed Nov. 20, 2015.
U.S. Appl. No. 14/642,526, filed Mar. 9, 2015.
U.S. Appl. No. 14/466,881, filed Aug. 22, 2014.
U.S. Appl. No. 14/260,237, filed Apr. 23, 2014.
U.S. Appl. No. 13/844,302, filed Mar. 15, 2013.
U.S. Appl. No. 12/881,881, filed Sep. 14, 2010.
Cyclic redundancy check, Wikipedia, http://en.wikipedia.org/wiki/Cyclic_redundancy_check, downloaded Apr. 30, 2014.
Shingled Magnetic Recording (SMR), http://www.hgst.com/science-of-storage/emerging-technologies/shingled-magnetic-recording, downloaded Apr. 30, 2014.
Low-density parity-check code, Wikipedia, http://en.wikipedia.org/wiki/LDPC, downloaded Apr. 30, 2014.
Suresh et al., "Shingled Magnetic Recording for Big Data Applications", Carnegie Mellon University, Parallel Data Laboratory, CMU-PDL-12-105, May 2012.
Schwarz et al., "RAID Organization and Performance," Jun. 1992, Distributed Computing Systems, Proceedings of the 12th International Conference on Parallel and Distributed Systems, 9 pages.

* cited by examiner

User sector1
User sector2
User sector3
Parity sector

Recovered User sector3

ERROR CORRECTION FOR STORAGE DEVICES

CROSS-REFERENCE TO RELATED APPLICATIONS

The present disclosure is a continuation of U.S. patent application Ser. No. 15/921,610, filed on Mar. 14, 2018, issued on Jan. 22, 2019, as U.S. Pat. No. 10,186,296, which is a continuation application of (and claims priority to) U.S. patent application Ser. No. 14/947,833, filed Nov. 20, 2015, issued on Mar. 20, 2018, as U.S. Pat. No. 9,922,678, which is a continuation application of (and claims priority to) U.S. patent application Ser. No. 14/642,526, filed Mar. 9, 2015, issued on Dec. 1, 2015, as U.S. Pat. No. 9,201,731, which is a continuation application of (and claims priority to) U.S. patent application Ser. No. 14/466,881, filed Aug. 22, 2014, issued on Mar. 24, 2015, as U.S. Pat. No. 8,988,800, which claims the benefit of the priority of U.S. Provisional Application Ser. No. 61/876,360, filed Sep. 11, 2013 and entitled "TRACK PARITY ECC FOR SMR HARD-DRIVE SYSTEMS", and U.S. patent application Ser. No. 14/642,526 is a continuation-in-part application of (and claims priority to) U.S. application Ser. No. 14/260,237, filed Apr. 23, 2014 and entitled "IMPLEMENTING RAID IN SOLID STATE MEMORY", issued on Mar. 10, 2015, as U.S. Pat. No. 8,977,813, which is a continuation of (and claims priority to) U.S. application Ser. No. 13/844,302, filed Mar. 15, 2013, and issued on May 13, 2014, as U.S. Pat. No. 8,725,944, which is a continuation of (and claims priority to) U.S. application Ser. No. 12/881,881, filed Sep. 14, 2010, and issued on Mar. 19, 2013, as U.S. Pat. No. 8,402,217, which claims the benefit of the priority of U.S. Provisional Application Ser. No. 61/242,662, filed on Sep. 15, 2009, and which claims the benefit of the priority of U.S. Provisional Application Ser. No. 61/254,577, filed Oct. 23, 2009; all of these prior applications are incorporated herein by reference.

BACKGROUND

The present disclosure describes systems and techniques relating to storage devices, such as Shingled Magnetic Recording (SMR) storage devices.

Various mediums are used to create storage devices for use in computing systems. In magnetic-medium-based storage devices, data can be stored on circular, concentric tracks on a magnetic disk surface. A read-write head can retrieve and record data on a magnetic layer of a rotating disk as the head flies on a cushion of air over the disk surface. When retrieving data, magnetic field variations can be converted into an analog electrical signal, which can then be amplified and converted to a digital signal for signal processing.

To increase the amount data that is stored in magnetic recording systems, smaller amounts of the magnetic medium have been employed to store each respective bit of data by using a smaller read-write head and corresponding track pitch, and by reducing the size of guard bands on either side of each track. As the recording densities have increased, various error correction techniques have been employed to assist in reading back the bits of data. In addition, in order to increase recording densities still further, some have proposed SMR to shrink the track pitch still further and remove the guard bands between tracks, which allows more tracks to fit on the recording medium. In SMR, the tracks are written so that one track partially overlaps the previous track.

SUMMARY

The present disclosure describes systems and techniques relating to storage devices, such as storage devices that employ Shingled Magnetic Recording (SMR). According to an aspect of the described systems and techniques, a device includes: circuitry configured to write stored data and parity data to discrete portions of a Shingled Magnetic Recording (SMR) track in a SMR storage device; and circuitry configured to detect an error and recover stored data for one of the discrete portions of the SMR track using the parity data and the stored data read from remaining ones of the discrete portions of the SMR track.

The circuitry configured to write can include a track error correcting code (ECC) encoder, and the circuitry configured to recover can include a track ECC decoder. The track ECC encoder can include a track ECC parity buffer having a size equal to that of data sectors in the SMR storage device and configured to accumulate an XOR value as the stored data is written to disk, and the track ECC decoder can include a track ECC parity buffer having the size equal to that of data sectors in the SMR storage device and configured to accumulate an XOR value as the stored data is read from disk. Moreover, the device can include memory protection circuitry for the track ECC parity buffer for both the track ECC encoder and the track ECC decoder.

The circuitry configured to write and the circuitry configured to recover can be are located in a read channel of the SMR storage device. The circuitry configured to write and the circuitry configured to recover can be are located in a hard disk controller for the SMR storage device, the hard disk controller being included on a system on chip.

According to another aspect of the described systems and techniques, a method includes: receiving, at a storage controller, a data request for a SMR storage device; reading, in response to the data request, stored data and parity data from discrete portions of a SMR track in the SMR storage device; detecting an error in data from the reading; and recovering stored data for one of the discrete portions of the SMR track using the parity data and the stored data read from remaining ones of the discrete portions of the SMR track.

The method can include using an error correcting code for data read from the discrete portions of the SMR track, wherein the recovering is performed for the one of the discrete portions of the SMR track when the error correcting code fails for the one of the discrete portions of the SMR track. The discrete portions of the SMR track can be a first section of the SMR track, the reading can include reading the SMR track in its entirety, including additional stored data and additional parity data from one or more additional sections of the SMR track, and the method can include recovering stored data for one or more of the one or more additional sections of the SMR track when an error correcting code fails for at least one discrete portion of the one or more additional sections of the SMR track.

The SMR track can be a first SMR track of the SMR storage device, and the method can include initiating reading of a second SMR track, which is at a different location in the SMR storage device than the first SMR track, before completing the recovering for the first SMR track. The method can also include: writing the stored data and the parity data to the discrete portions of the SMR track in the SMR storage device before the reading; accumulating an XOR value in at least one parity buffer during both the writing and the reading; and using memory protection with the at least one parity buffer. Moreover, the method can include using an error correcting code and a cyclic redundancy check for data read from the discrete portions of the SMR track, wherein the recovering is performed for the one of the discrete portions of the SMR track when either the error correcting code or the cyclic redundancy check fails for the one of the discrete portions of the SMR track.

According to another aspect of the described systems and techniques, a system includes: a Shingled Magnetic Recording (SMR) storage device; and a storage controller coupled with the SMR storage device and configured to receive a data request for the SMR storage device, read stored data and parity data from discrete portions of a SMR track in the SMR storage device, and recover stored data for one of the discrete portions of the SMR track using the parity data and the stored data read from remaining ones of the discrete portions of the SMR track. In some implementations, the storage controller is configured to store track parity data for a partially completed write operation upon power-down.

The described systems and techniques can be implemented in electronic circuitry, computer hardware, firmware, software, or in combinations of them, such as the structural means disclosed in this specification and structural equivalents thereof. This can include at least one computer-readable medium embodying a program operable to cause one or more data processing apparatus (e.g., a signal processing device including a programmable hardware processor) to perform operations described. Thus, program implementations can be realized from a disclosed method, system, or apparatus, and apparatus implementations can be realized from a disclosed system, computer-readable medium, or method. Similarly, method implementations can be realized from a disclosed system, computer-readable medium, or apparatus, and system implementations can be realized from a disclosed method, computer-readable medium, or apparatus.

For example, the disclosed embodiments below can be implemented in various systems and apparatus, including, but not limited to, a special purpose data processing apparatus (e.g., a wireless access point, a remote environment monitor, a router, a switch, a computer system component, a medium access unit), a mobile data processing apparatus (e.g., a wireless client, a cellular telephone, a personal digital assistant (PDA), a mobile computer, a digital camera), a general purpose data processing apparatus (e.g., a minicomputer, a server, a mainframe, a supercomputer), or combinations of these.

The described systems and techniques can result in one or more of the following advantages. Error correction can be performed on a much larger block size, in addition to traditional error correction performed for each sector on a disk. This can be of particular value in SMR, where it is typically not possible to overwrite a single sector in place; rather, updating a single sector in SMR can involve moving an entire track or band of tracks to a different location on disk. The error correction can be accomplished even when the read failure makes the originally read data completely unusable, and the amount of parity data overhead used can be adjusted as needed to allow for more robust error recovery capability.

The described systems and techniques can result in fast error recovery from the host perspective. In the case of a failed sector, rather than keeping the head put on the same track until the sector is recovered, a controller can initiate a seek to service a next host command, since it can already be known that the failed sector can be recovered using the data already read from the disk, e.g., if only a single sector of a group failed to read, it can be known with certainty that the error is correctable using the group's error correcting code.

Thus, a controller can begin correcting a read failure and meanwhile start moving the head in the hard drive into position for a next read/write operation.

Details of one or more implementations are set forth in the accompanying drawings and the description below. Other features and advantages may be apparent from the description and drawings, and from the claims.

DESCRIPTION

Figure 1A:
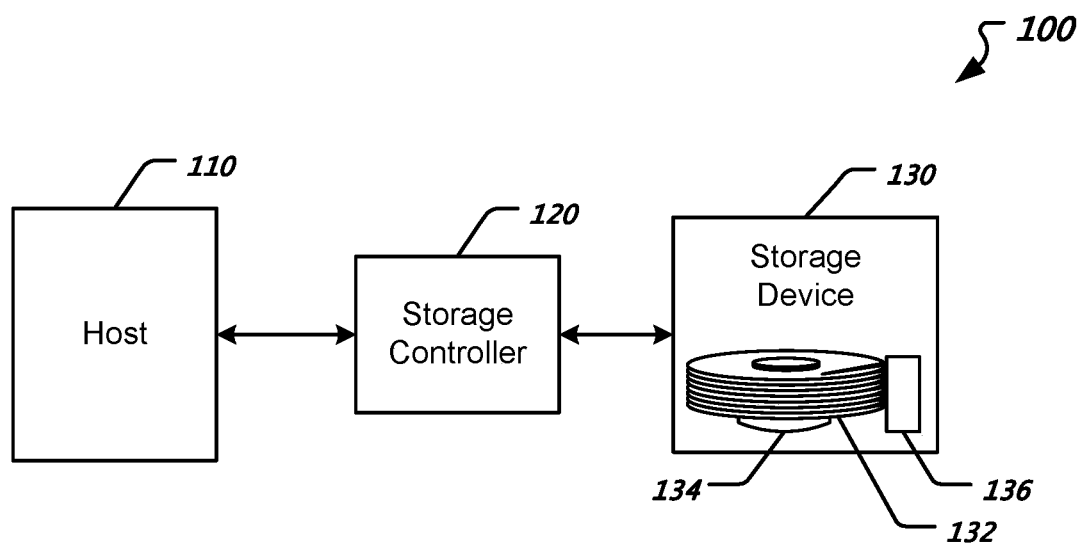
FIG. 1A shows an example of a data storage system.

FIG. 1A shows an example of a data storage system 100. A host 110 is coupled with a storage controller 120. The storage controller 120 interfaces with a storage device 130 and is configured to employ one or more of the systems and techniques described in this disclosure. The storage controller 120 can be implemented in various ways. For example, the storage controller 120 can include a printed circuit board (PCB) with various set of processing circuitries designed to handle designated tasks. The storage controller 120 can also include registers, volatile memory, non-volatile memory, or a combination of these, which can be used to buffer user data, hold control data or code (e.g., track parity data for a partially completed write operation as described in further detail below), or both. In some implementations, the storage controller 120 includes a hardware processor that is programmed to perform specified tasks by firmware, software, or a combination of these.

The storage controller 120 can include a hardware interface through which commands from the host 110 can be received, and the storage controller 120 can decode such host commands and operate the storage device 130 in response thereto. The storage device 130 can include various types of storage mediums, such as a magnetic medium, an optical medium, a solid-state memory medium (e.g., NAND-based flash memory), or a combination thereof. In some implementations, the storage device 130 can be a hard disk drive (HDD). In some implementations, the storage device 130 can employ Shingled Magnetic Recording (SMR), which can be performed using various structures, such as a HDD or a tape drive. Moreover, the storage controller 120 can include various modules, such as a processing module, a control module, a detection module, and a compensation module, and the storage controller 120 can be a hard disk controller (HDC) and control HDD functions, such as controlling the speed of a spindle motor, controlling a voice coil motor (VCM), and managing power consumption.

In some implementations, the storage device 130 includes a disk drive with multiple magnetic media disks 132 mounted on an integrated spindle and motor assembly 134. The disk drive further includes a head assembly 136, which can include a read signal circuit, a servo signal processing circuit, and a write signal circuit. The disk drive can also include a PCB, with various drive electronics (e.g., a printed circuit board assembly (PCBA) with semiconductor devices). The magnetic media disks 132 can be coated with a particulate surface or a thin-film surface and can be written to, or read from, a single side or both sides of each disk. The head assembly 136 can include a preamp/writer, where head selection and sense current value(s) can be set, and the disk drive can be a SMR disk drive that operates as described in further detail below.

Although shown as separate elements in FIG. 1A, e.g., with signals between the elements carried through a flexible printed cable, the various parts of the data storage system 100 can be integrated into various circuit devices, systems on chip, apparatus, or combinations thereof. The storage controller 120 can be integrated into the host 110 or into the storage device 130. In general, the systems and techniques described herein can be implemented as one or more devices, such as one or more integrated circuit (IC) devices, which may or may not be combined with a storage device at the point of sale.

The storage controller 120 can include a subset of the elements ascribed to it in various examples herein and/or other elements ascribed to the host 110 or the storage device 130. Thus, in some implementations, the storage controller 120 can be one or more IC chips (e.g., a combo chip or system on chip (SOC)), which can include read/write channel signal processing circuitry, which can further include error correction circuitry. The storage controller 120 can be a microprocessor and a hard disk controller, with associated read only memory (ROM) and random access memory (RAM) or interfaces thereto.

Figure 1B:
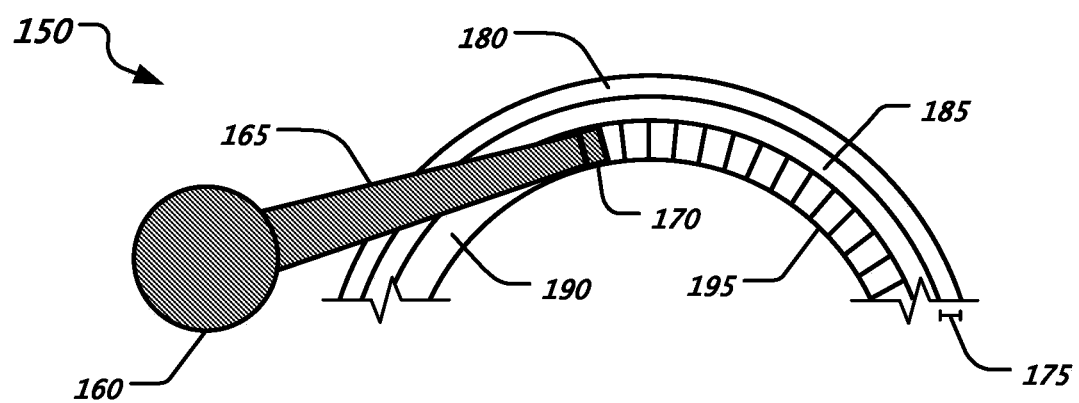
FIG. 1B shows an example of Shingled Magnetic Recording (SMR).

FIG. 1B shows an example 150 of SMR, as can be used in the disk drive of FIG. 1A. VCM 160 can be used to position an arm 165, and thus its read-write head 170, over a desired track. The head 170 has been used to write a first track 180, followed by a second track 185, and is currently writing a third track 190. As shown, the track pitch 175 is smaller than the head 170, and the sectors of each track (e.g., a sector 195 of track 190) are written to partially overlap the previously written track. Thus, the process of writing sectors in SMR can be thought of as similar to installing shingles on the roof of a house.

Since the read-write head 170 is smaller than the track pitch, reading back the track can prove difficult. Typically, the entire track (e.g., track 180) is read in order to accurately read any given sector in the track. Thus, random access to a single sector of a track is often not possible in SMR. In addition, it can be desirable to read more than one track in order to accurately read a sector of one track. For further details regarding SMR reading and writing techniques, see U.S. Pat. No. 8,300,339 to Nangare et al., U.S. Pat. No. 8,599,508 to Burd, U.S. Pat. No. 8,625,215 to Burd et al., and U.S. Pat. No. 8,638,513 to Burd, all of which are hereby incorporated by reference.

Figure 2A:
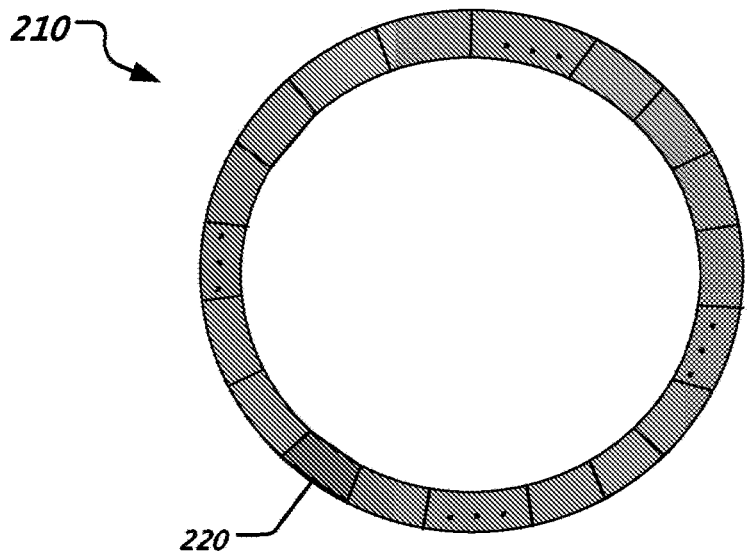
FIG. 2A shows an example of writing a track in a SMR storage device.

FIG. 2A shows an example of writing a track 210 in a SMR storage device. In this example, an entire SMR track 210 is shown, with a parity sector 220 for all remaining sectors of the SMR track 210. However, the systems and techniques described herein are applicable to discrete portions of a SMR track 210 other than the track sectors used by the disk drive for reading and writing, e.g., where each track sector can include 4 kilobytes (KB) of data with associated cyclic redundancy check (CRC) data. In addition, rather than using a single parity sector for an entire SMR track, some implementations divide the SMR track into sections (or groups of the discrete portions) and can use a parity sector with each such section of the SMR track.

Although such sections of the track would likely include more than only three discrete portions, e.g., sectors, the example presented in FIG. 2A shows three sectors for simplicity of this description. As shown, the data of a first user sector 212, a second use sector 214, and a third use sector 216 are exclusive or'ed (XOR) with each other to produce a parity sector 222 when writing data to the SMR track 210. Because SMR involves writing and reading larger sections of the track (or multiple tracks) to write and read the data of a single sector, adding the data of the parity sector 222 provides another level of protection for data without substantial new costs in the system. This parity data provides error correction code (ECC) capability at a level above sectors, e.g., track ECC parity obtained by XOR-ing different sectors (bit-wise) in the track; a track ECC encoder can generate a parity sector by bit-wise XOR-ing all the sectors of a track (i.e., XOR bit 0 in all of the sectors of a group, XOR bit 1 in all of the sectors of a group, etc., as shown).

Figure 2B:
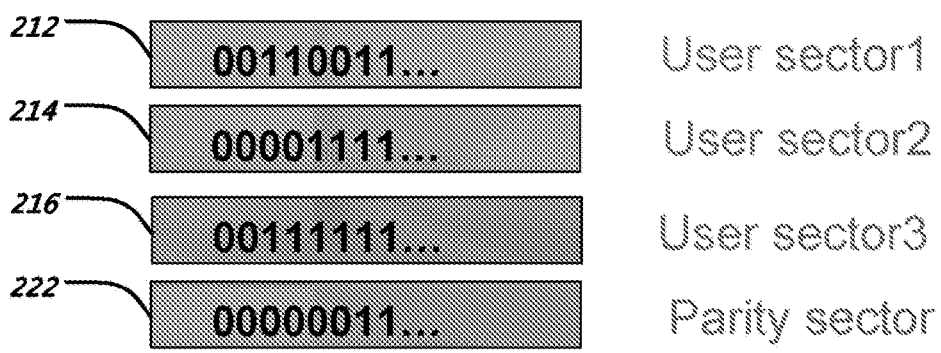
FIG. 2B shows an example of reading a track in a SMR storage device.
Figure 2B:
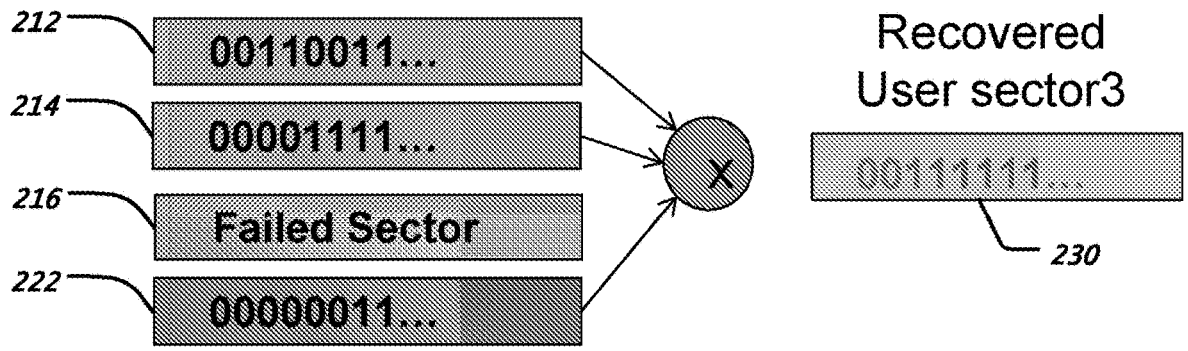

Track ECC is capable of recovering a single sector failure on a given track provided that the rest of the sectors on the track can be read error free. FIG. 2B shows an example of reading a track in a SMR storage device, where parity data for only a portion of the track is used to recover one of the sectors in that portion of the track. As shown, the sectors 212, 214, 216, and 222 are read back from the SMR track. These sectors can be decoded in normal mode (NRM), which can include error detection, error correction, or both, at a per sector level. For example, the NRM can use LDPC (low-density parity-check) on a per-sector basis, which will indicate whether each respective sector failed or succeeded in decode.

Thus, even when error correction techniques are employed per sector, the reading of a sector can fail, such as shown by failed sector 216. However, by XOR-ing the sectors 212 and 214 that were successfully read back with the successfully read parity sector 222, the data 230 of the third user sector 216 is recovered. Thus, any single sector in a group of sectors protected by a parity sector can be recovered if that sectors fails in NRM. A track ECC decoder can recover failed sectors by XOR-ing remaining sectors at a track level or at a level smaller than a track level. In general, a failed sector may be recoverable by track ECC parity decoding if it is the only failed sector in its group. Note that while only one sector (or larger discrete portion) per group can be recovered, the recovery can be accomplished no matter how bad the read was for that failed sector (or larger discrete portion). Moreover, the grouping, and thus the amount of parity data used for the SMR track, can be adjusted as needed from one implementation to another, or dynamically adjusted within a given implementation, in order to enable recovery of more than one sector per SMR track.

Figure 3:
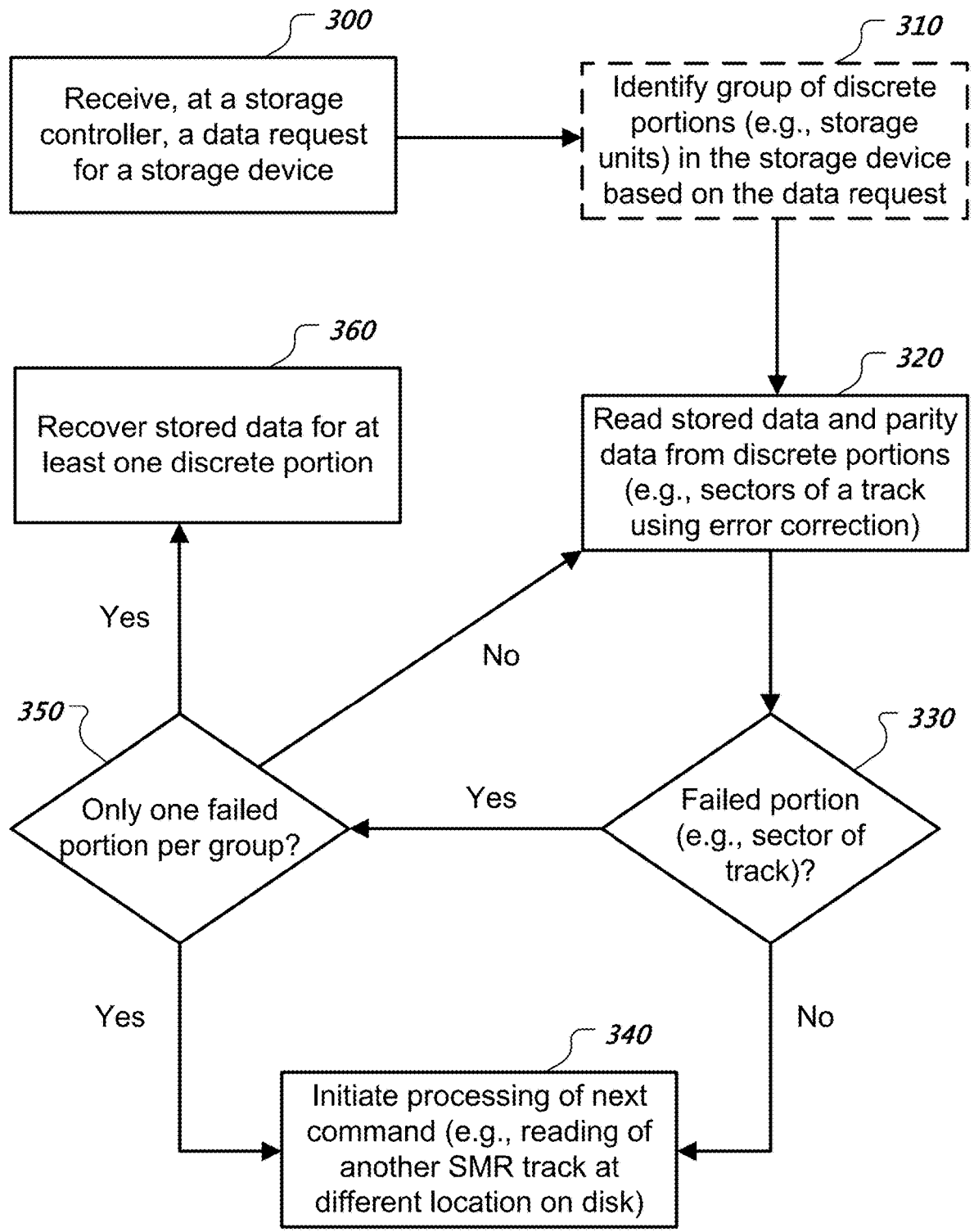
FIG. 3 is a flowchart showing an example of reading stored data and parity data in a storage system.

FIG. 3 is a flowchart showing an example of reading stored data and parity data in a storage system. At 300, a data request for a storage device (e.g., a SMR storage device as described herein) is received at a storage controller. At 310, a group of discrete portions of a storage medium in the storage device can be identified based on the data request.

These discrete portions can be first units of storage located in a second unit of storage in the storage device, such as sectors in a SMR track, where the first units of storage are each of equal size, and the second unit of storage is larger than the equal size of the first units of storage. In some implementations, there is no need to identify at 310 since the discrete portions (e.g., sectors of a SMR track) may be already defined by the data request. However, in some cases, the discrete portions of the storage medium that are grouped together, for inclusion of higher level parity data for the group, may be assigned by a separate process (i.e., not predetermined for a given implementation) and thus should be identified at 310.

At 320, stored data and parity data are read from the discrete portions (e.g., sectors of a SMR track in a SMR storage device). This reading of data can include using an error detection and/or correction code, such as LDPC. At 330, a check is made to determine whether the read failed for any of the discrete portions (e.g., for any sectors in the track). This can involve checking whether any ECC used for the read data has failed to correct any error. When there are no failures for the read, processing of a next command (e.g., reading another SMR track at a different location on the disk) is initiated at 340.

When there is a read failure, a check is made at 350 to determine if there is only one failed portion per group. In some implementations, a SMR track can have its sectors divided among two or more groups that each has its own parity sector. Thus, an entire track can be read together, and then the checking can be done separately for each group in the track. If a group (one or many) in the read has more than one failed data portion, then the process can return to reading. Note that the flowchart shows a return to the same read operation as before, but the follow up read can be in an error recovery mode, where additional operations are performed to improve the chances of a successful read on subsequent read attempts.

When there is at most one failed data portion for each group (one or many), the stored data in the failed data portion(s) is recovered at 360 using the parity data and the stored data read from remaining ones of the discrete portions in the group(s). In addition, processing of a next command (e.g., reading another SMR track at a different location on the disk) can be initiated at 340. This is because recovery of the data that wasn't successfully read from the storage device is effectively guaranteed at this point. Thus, the initiating at 340 after the check at 350 can be done before or immediately after the recovery begins at 360, and these two operations (recovery and processing a next command) can proceed in parallel.

This ability to proceed to a next command while still recovering from a failed read can facilitate fast error recover from the host perspective. In a disk drive, rather than having to keep the head on the same track until the sector is recovered, the head can be moved to the next track because it is known that the read failure can be recovered without having to access that portion of the disk again. This can be a significant advantage in SMR, where the added overhead of this approach has much less impact than would be the case in traditional magnetic recording.

In some implementations, track level ECC error recovery can be performed in accordance with the following pseudo code:

0. Assume normal mode (NRM) failed and track ECC decoding needs to start;
1. HDC issues read for the entire track;
2. HDC enables track ECC decoder and resets track ECC; ( sets track ECC Buffer back to ZERO);
3. Check the status of track ECC decoder, TRACK_ECC_STATUS;
If TRACK_ECC_STATUS=1, then can start seeking to the next location;
Else go to error recovery.

Here, TRACK_ECC_STATUS is 1 if there are one or fewer failed host sectors, and 0 if there are more than one failed host sectors.

Figure 4A:
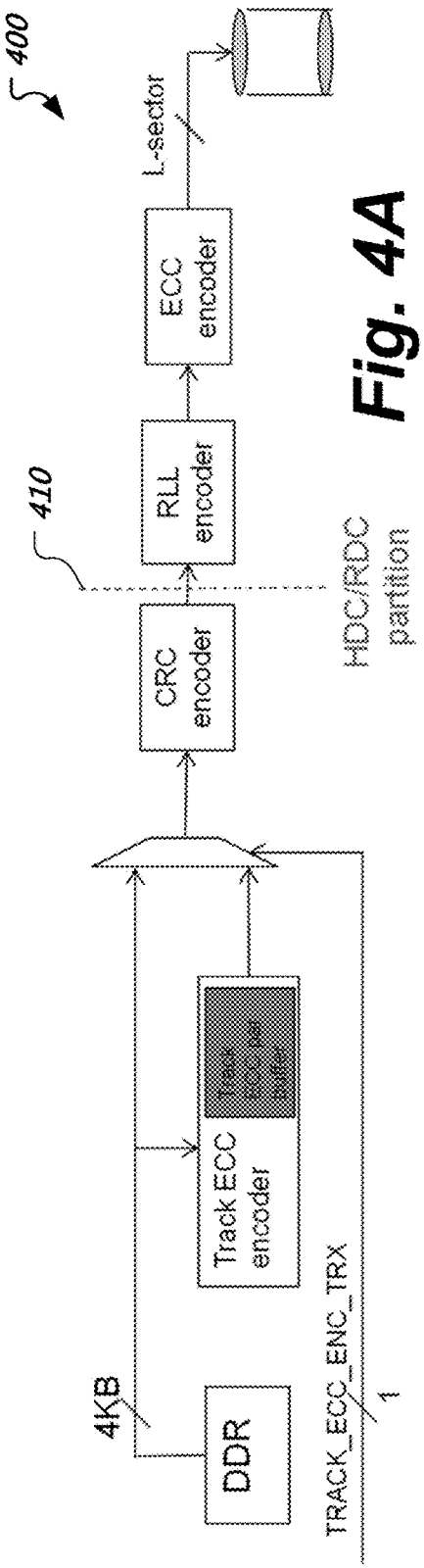
FIGS. 4A & 4B show examples of details for a track ECC (error correction code) encoder.

FIG. 4A shows examples of details 400 for a track ECC encoder. In this example, the track ECC encoder resides in the HDC (left side of partition 410 in FIG. 4A). In other implementations, the ECC encoder can reside inside the RDC (read channel) after the CRC encoder (right side of partition 410 in FIG. 4A), which also includes a RLL (Run Length Limited) encoder and ECC encoder used at the user sector level when writing L sectors to disk. In some implementations, the RDC is implemented in hardware in the head-disk assembly, and the HDC is implemented as a SOC.

The track ECC encoder can include a track ECC parity buffer and can accumulate in this buffer an XOR of all host sectors (e.g., 4 KB sectors) for a given track, as they are written out from a DDR (double data rate) memory. Once the track ECC parity has been computed, the controller writes it, e.g., as the last sector of the track by asserting TRACK_ECC_ENC_TRX.

Figure 4B:
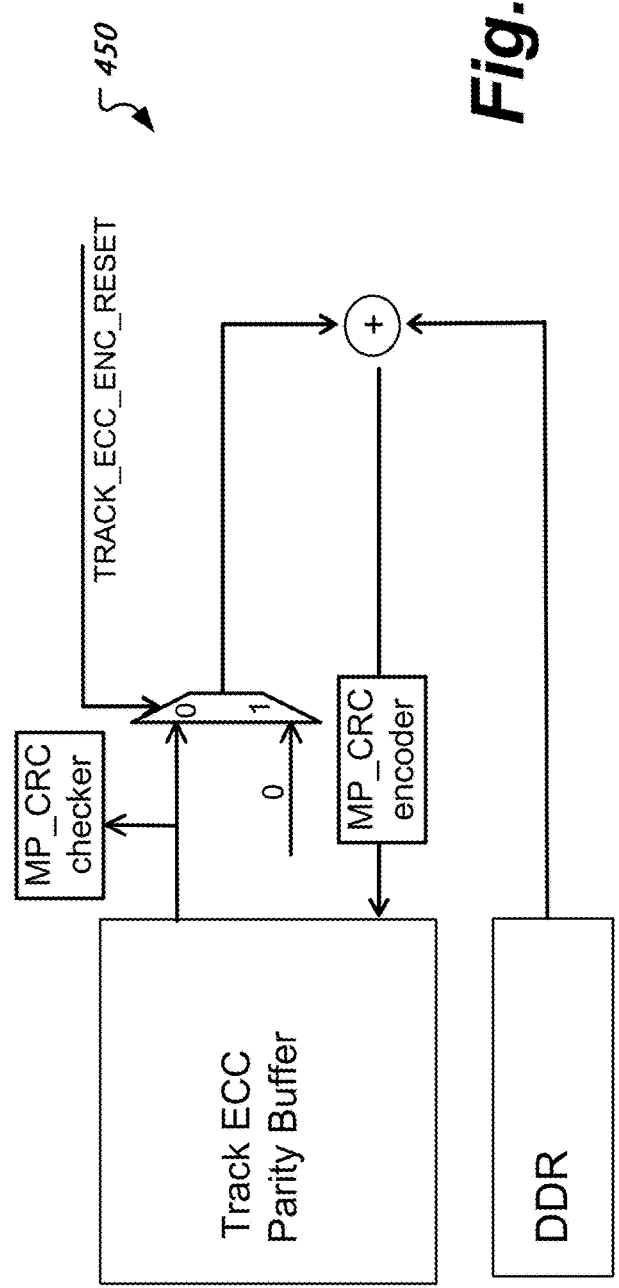

FIG. 4B shows examples of additional details 450 for a track ECC encoder. TRACK_ECC_ENC_RESET can be used to reset the track ECC parity buffer to zero. In some implementations, this is done each time a new track is encoded. However, instead of encoding per track, the encoding can be done for each of two or more parts of the track. In addition, in some implementations, the track ECC parity buffer can be protected, such as by using CRC memory protection (MP_CRC).

The encoding buffer can be the same size as the host sector size (e.g., 4 KB). When the host data is being written to disk, it can be encoded by an MP_CRC encoder each time before being written into the track ECC parity buffer and also checked by an MP_CRC checker each time after being read, including when it is transferred to the RDC. While the chances of an error occurring when accessing the memory of the parity buffer may be very small, corruption of this data can have a significant negative impact on the system. Thus, use of memory protection for the parity buffer can help in providing a robust system.

Figure 5A:
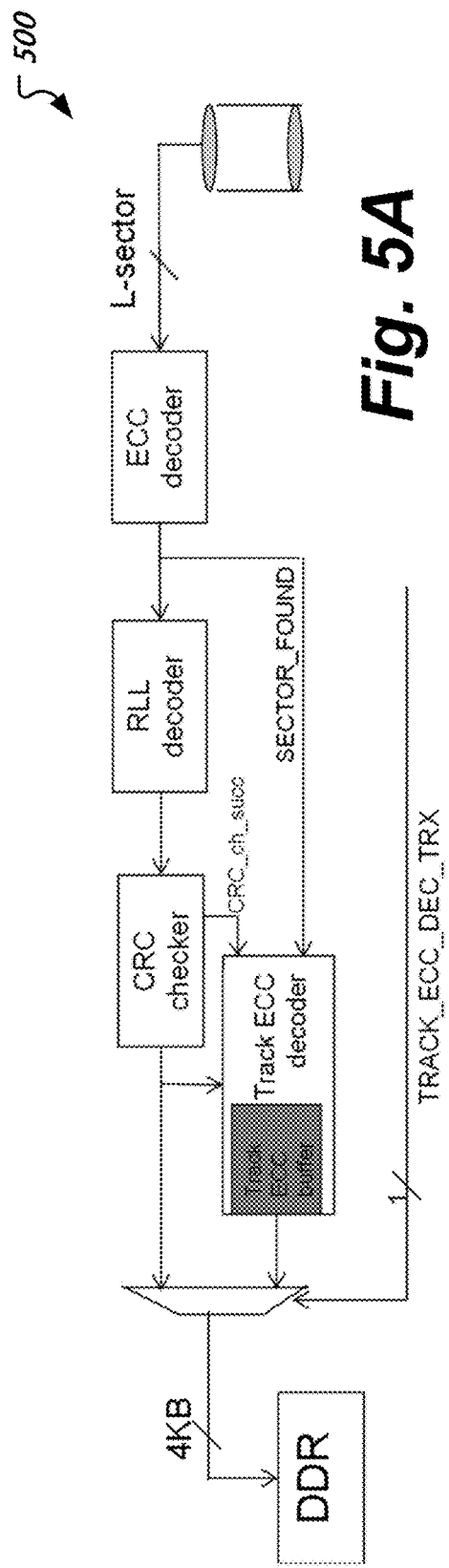
FIGS. 5A & 5B show examples of details for a track ECC decoder.

FIG. 5A shows examples of details 500 for a track ECC decoder. L sectors of data (e.g., the entire track of data on the disk) can be read out using an ECC decoder, a RLL decoder and a CRC checker during a track ECC decoding operation. The track ECC decoder can automatically accumulate an XOR of all correctly decoded host sectors in an included track ECC buffer. Note that a host sector is correctly decoded if SECTOR_FOUND=1 and CRC_ch_succ=1, i.e., both the ECC decoder and CRC checker have succeeded.

While the use of the CRC checker here is optional, in some implementations this added level of confidence can be useful. Note that it is possible that the read gives a valid codeword that doesn't pass CRC, such as due to a miscorrection. Thus, the double check can provide a more robust system. If SECTOR_FOUND=0 or CRC_ch_succ=0, then the host sector has failed. If at most one host sector fails per track, then following the track read operation, the track ECC buffer will contain the failed sector, and the controller can go ahead and request a transfer operation (TRACK_ECC_DEC_TRX).

Figure 5B:
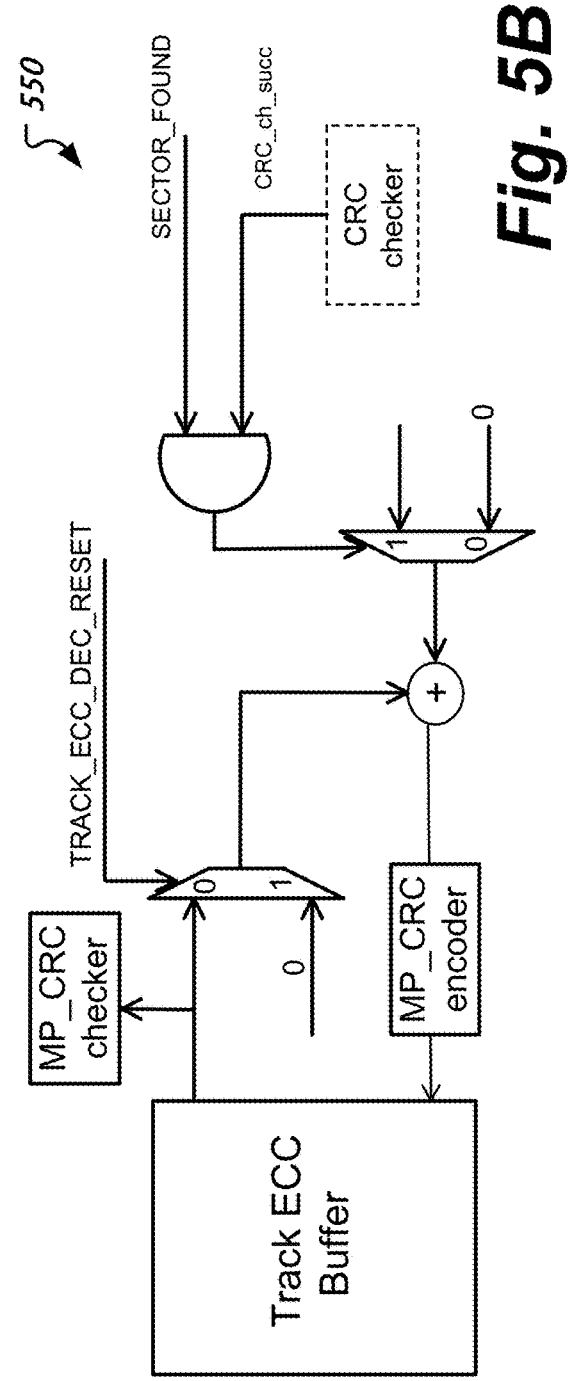

FIG. 5B shows examples of additional details 550 for a track ECC decoder. The track ECC decoder can accumulate an XOR of all correctly decoded host sectors in the track ECC buffer. TRACK_ECC_DEC_RESET can be used to reset the track ECC buffer to zero. The indicator of a failed host sector can involve performing the logical AND of SECTOR_FOUND (received from the RDC) and the signal "CRC_ch_succ" indicating whether the CRC checker has succeeded.

In addition, memory protection can be used in the track ECC decoder also. Data can be encoded by MP_CRC encoder each time before being written into the track ECC buffer and checked by MP_CRC checker each time after being read, including the time when it is transferred to DDR. In addition, it should be noted that when using memory protection for the track ECC decoder (and also the track ECC encoder) the CRC circuitry should be placed right next to the memory being protected.

Figure 6:
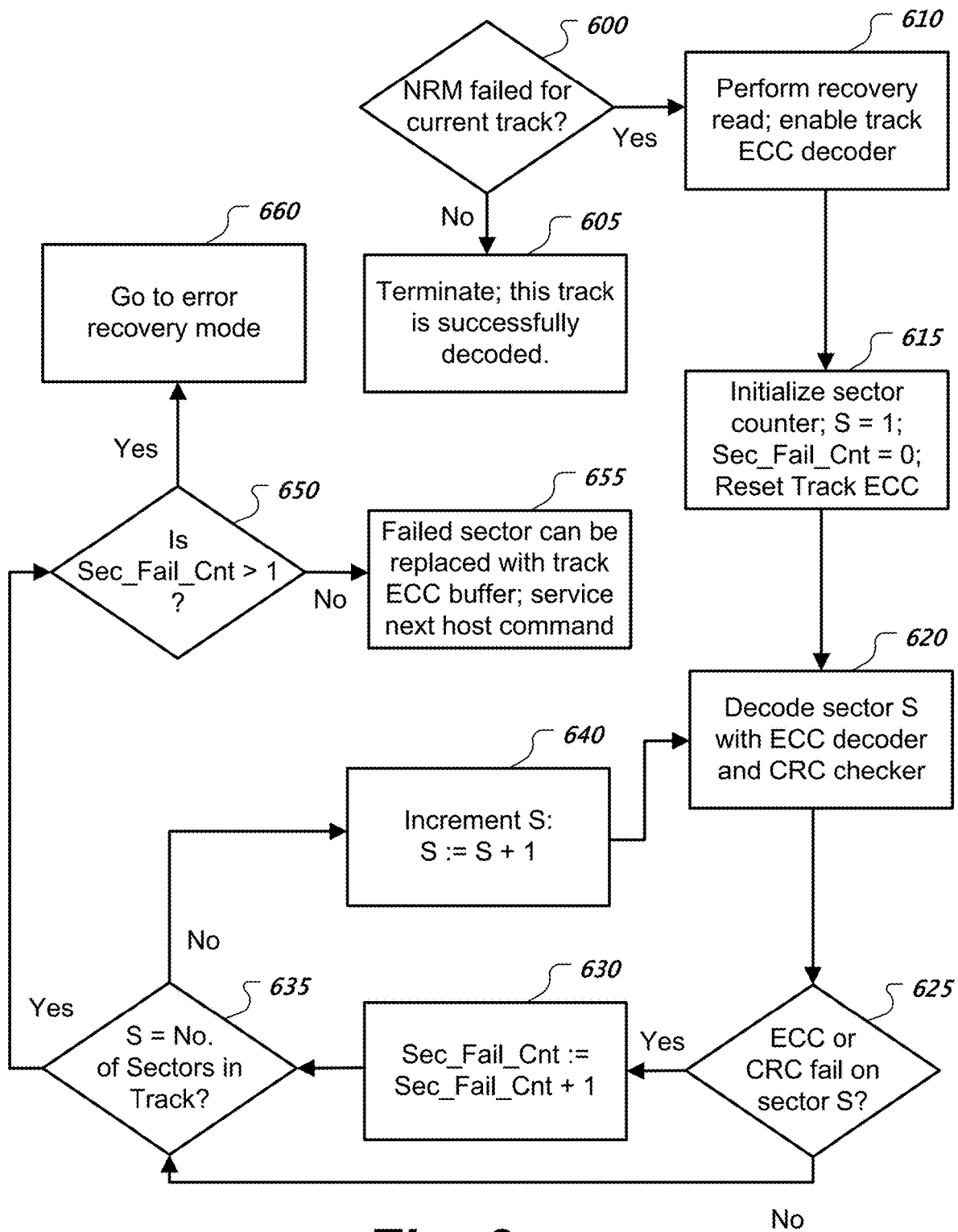
FIG. 6 is a flowchart showing an example of track ECC error recovery over one track.

FIG. 6 is a flowchart showing an example of track ECC error recovery over one track. At 600, a check is made to determine whether the normal mode (NRM) read failed for a current track. If not, reading of this track can be terminated at 605 since the track was read successfully. When there was a read failure in NRM, a recovery read of the track can be performed at 610 with a track ECC decoder enabled. Note that such a recovery read will not be needed in all implementations since the track ECC decoder can also be enabled during (and parity checking performed) during NRM.

At 615, a sector counter (in a given track) is initialized (set S=1), a sector fail counter is also initialized (Sec_Fail_Cnt=0), and the track ECC is reset (set track ECC buffer to ZERO). At 620, sector S is decoded with ECC decoder and CRC checker. At 625, a check is made to determine if the ECC decoder failed or if the CRC checker failed on sector S (Is SECTOR_FOUND=0 or "crc_ch_succ"=0?). If so, the sector fail counter is incremented at 630.

At 635, a check is made to determine if an attempted decoding has been performed for all the sectors in the track (Is S=Number of Sectors in Track?). If not, the sector count is incremented at 640, and the process continues at 620. If so, a check is made at 650 to see if the sector fail counter is greater than one. If so, there have been too many errors to recover from using the parity data, and the process enters an error recover mode at 660, where additional steps can be taken to try to successfully read the data. If not, and if TRACK_ECC_STATUS equals 1, then the track is successfully decoded by replacing only the failed sector with the content of the track ECC buffer at 655, and the process can seek to service the next command (e.g., the head can be moved to the next read since the single failure can be readily recovered).

Figure 7A:
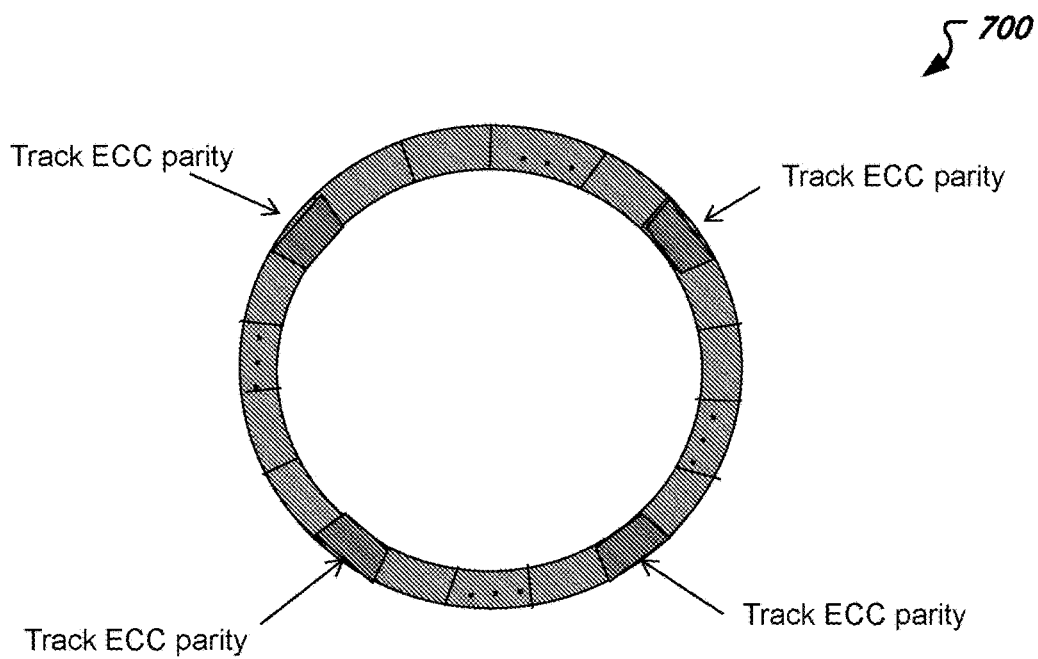
FIG. 7A shows another example of writing a track in a SMR storage device.

FIG. 7A shows another example of writing a track 700 in a SMR storage device. In some implementations, the track ECC feature can allow the user to control how many parity sectors are written per track. This can be implemented using the storage controller in FIG. 1A, and in the example shown, the user has specified that four track ECC parity sectors be written per track. The track ECC buffer can accumulate the track ECC parity until the firmware requests that this buffer be written on the drive. This request can come after any number of host sectors have been encoded (XOR-ed and accumulated in the track ECC parity buffer).

Figure 7B:
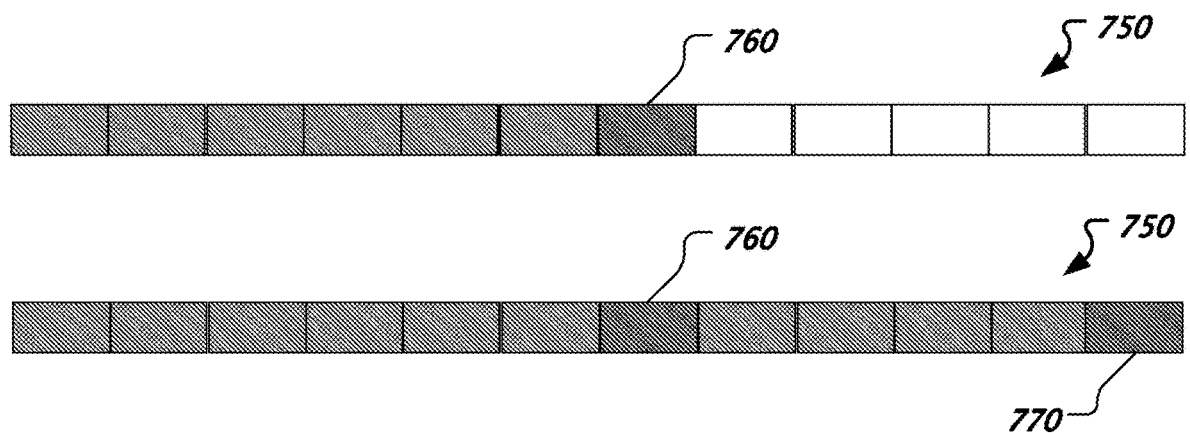
FIG. 7B shows an example of writing a partial sector in a track in a SMR storage device.

FIG. 7B shows an example of writing a partial sector in a track 750 in a SMR storage device. If the controller decides to only write a partial track, it can "close" a track by writing track ECC parity 760 at any moment. For example, there may be an interrupt in the system, such as a power down, and this partial track writing can prevent loss of data. Note that due to the large size of a track, it might not be possible to finish encoding/decoding over the entire track in case of power down. If later on, the controller decides to continue writing on a previously closed track, it can do so by encoding remaining sectors into a track ECC codeword with an additional track ECC parity 770. Thus, in this example, two parity sectors 760 and 770 are written in a track (or part of a track) that would normally have only one parity sector.

In some implementations, the power-down (or power-loss) situation can be handled by dumping a partial track ECC parity to a NAND storage unit in the controller. Thus, the content from the track ECC parity buffer can be flushed back to the controller, and written to NAND. Then, upon power resume, the partial track ECC stored on the NAND can be moved back to the parity buffer to resume writing the track.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Other embodiments fall within the scope of the following claims.

What is claimed is:

1. A method for performing error recovery for data stored on a first shingled magnetic recording (SMR) track of a storage device, the method comprising:
    receiving a request to read the data from the first shingled magnetic recording (SMR) track of the storage device;
    identifying a plurality of sectors of the first shingled magnetic recording (SMR) track to be read in response to the request;
    reading (i) the data from the plurality of sectors of the first shingled magnetic recording (SMR track, and (ii) parity data;
    based on the data read from the plurality of sectors, determining whether any of the plurality of sectors corresponds to a failed sector;
    responsive to any of the plurality of sectors corresponding to a failed sector,
        recovering a portion of the data from the failed sector of the first shingled magnetic recording (SMR) track using (i) the parity data and (ii) portions of the data stored in remaining ones of the plurality of sectors; and
        while recovering the portion of the data from the failed sector of the first shingled magnetic recording (SMR) track, reading data from a second shingled magnetic recording (SMR) track of the storage device.

2. The method of claim 1, wherein identifying the plurality of sectors of the first shingled magnetic recording (SMR) track includes identifying the plurality of sectors based on the request.

3. The method of claim 1, wherein the request indicates the plurality of sectors.

4. The method of claim 1, wherein reading the data from the plurality of sectors of the first shingled magnetic recording (SMR) track includes reading the data using at least one of an error detection code and a correction code.

5. The method of claim 1, wherein recovering the portion of the data from the failed sector includes recovering the portion of the data in response to a determination that only one of the plurality of sectors corresponds to a failed sector.

6. The method of claim 5, further comprising, in response to the determination that only one of the plurality of sectors corresponds to a failed sector, initiating processing of a command subsequent to the request to read the data.

7. The method of claim 6, wherein the command subsequent to the request to read the data is a second request to read different data from the storage device while recovering the portion of the data from the failed sector.

8. A system for performing error recovery for data stored on a first shingled magnetic recording (SMR) track of a storage device, the system comprising:
    decoder circuitry configured to, in response to a request to read the data from the first shingled magnetic recording (SMR) track of the storage device,
        identify a plurality of sectors of the first shingled magnetic recording (SMR) track to be read in response to the request,
        read the data from the plurality of sectors of the first shingled magnetic recording (SMR track, and
        based on the data read from the plurality of sectors, determine whether any of the plurality of sectors corresponds to a failed sector; and
    recovery circuitry configured to recover a portion of the data from the failed sector of the first shingled magnetic recording (SMR) track using (i) parity data and (ii) portions of the data stored in remaining ones of the plurality of sectors,
    wherein the decoder circuitry is further configured to, while the recovery circuitry is recovering the portion of the data from the failed sector of the first shingled magnetic recording (SMR) track, read data from a second shingled magnetic recording (SMR) track of the storage device.

9. The system of claim 8, wherein the request indicates the plurality of sectors.

10. The system of claim 8, wherein, to read the data from the plurality of sectors of the first shingled magnetic recording (SMR) track, the decoder circuitry is further configured to read the data using at least one of an error detection code and a correction code.

11. The system of claim 8, wherein, to recover the portion of the data from the failed sector, the recovery circuitry is further configured to recover the portion of the data in response to a determination that only one of the plurality of sectors corresponds to a failed sector.

12. The system of claim 11, wherein the decoder circuitry is further configured to, in response to the determination that only one of the plurality of sectors corresponds to a failed sector, initiate processing of a command subsequent to the request to read the data.

13. The system of claim 12, wherein the command subsequent to the request to read the data is a second request to read different data from the storage device while recovering the portion of the data from the failed sector.

* * * * *